Patented Apr. 13, 1954

2,675,369

UNITED STATES PATENT OFFICE 2,675,369

CROSS-LINKED ANILINE RESINS USING A DIURETHANE AS THE CROSS-LINKING AGENT

Paul H. Scrutchfield, Anna, Ill., assignor to American Cyanamid Company, New York, N. Y., a corporation of Maine No Drawing. Application January 30, 1953, Serial No. 334,381

8 Claims. (Cl. 260—72.5)

This invention relates to resinous compositions and to the method of preparing the same. More particularly this invention relates to cross-linked aniline aldehyde resins and to the production thereof.

The formation of condensation products by the reaction of primary aromatic amines and aldehyde compounds is well-known. It is customary to react the primary aromatic amine and the aldehyde in a mineral acid solution whereby infusible and insoluble but thermoplastic products are obtained. During the reaction it is important that the temperature does not rise too high. When a slight excess of the aldehyde above stoichiometric proportion of the primary aromatic amine is employed, a long chain polymer which has adjacent chains connected with alkylene groups are formed which are tough, heat resistant, but thermoplastic.

It is an object of this invention to prepare primary aromatic amine aldehyde resinous products which are cross-linked to form thermosetting products. It is a further object of this invention to employ as the cross-linking agent certain diurethanes. These and other objects of this invention will be discussed more fully hereinbelow.

A typical aniline aldehyde resin utilized in my invention is prepared as shown in the example set forth below. All parts set forth are parts by weight and should not be considered critical unless noted in the appended claims.

Example 1

Into a flask equipped with a dropping funnel, thermometer and reflux condenser are charged 465 parts of aniline suspended in 500 parts of water. 500 parts of concentrated hydrochloric acid was then added with cooling. With the addition of 405 parts of formalin (37% formaldehyde) the temperature rose to 80° C. where it was maintained. After stirring 1 hour and diluting with 1500 parts of water, 200 parts of sodium hydroxide dissolved in 500 parts of water was added over a period of 2 hours.

The resin was filtered and washed with water until the washing gave only a faint chlorine test. The resin was then air dried. In the production of the above resin formaldehyde itself and also its polymers or any other substance splitting off formaldehyde under conditions of the condensation may be used. Other aldehydes may also be used in the resin formation which are paraformaldehyde, acetalaldehyde, butyraldehyde, acetaldol and the like.

When employed in this application, the term "primary aromatic amine" is intended to cover not only true primary aromatic amines but also those substances which act like the true primary aromatic amines under the conditions of the condensation reaction. Included within this definition are such compounds as aniline, ortho-, meta-, or para-toluidine, the xylidines, and alpha or beta naphthylamine and the like.

Any strong mineral acid may be employed in the condensation reaction. While I have employed hydrochloric acid in the above example, other acids such as sulfuric or nitric may be utilized.

Also, the reaction temperature may vary within fairly wide limits. However, it is desirable that the temperature during the condensation reaction be maintained below about 100° C.

It is also possible to employ strong bases other than sodium hydroxide to neutralize the strong mineral acid after the completion of the condensation reaction.

In preparing the aniline formaldehyde resin a slight excess of formaldehyde is desirable. However, if too great an excess of formaldehyde is employed, undesirable properties are imparted to the reaction product. Accordingly, the molar ratio of aniline to formaldehyde used will vary from about 1 mol to about 1.5 mols of formaldehyde per mol of aniline with the preferred ratio being from about 1 mol to about 1.2 mols of formaldehyde per mol of aniline.

I have found that by employing certain diurethanes a cross-linked thermosetting resinous product may be obtained. However, all diurethanes do not produce the desired properties in the final product. Such diurethanes as ethylene diurethane, benzidine diurethane, tolylene diurethane, m-phenylene diurethane, o-dianisidine diurethane do not react to cross link the aniline formaldehyde resins. I have found that such compounds as oxalyl diurethane and adipyl diurethane react with the aniline formaldehyde resins causing them to cross-link and become thermosetting.

The diurethanes which I have found to cross-link aniline formaldehyde resins have the general formula set forth below:

$$CH_3-CH_2-O-\overset{O}{\overset{\|}{C}}-\overset{H}{\overset{|}{N}}-\overset{O}{\overset{\|}{C}}-(CH_2)_n-\overset{O}{\overset{\|}{C}}-\overset{H}{\overset{|}{N}}-\overset{O}{\overset{\|}{C}}-O-CH_2-CH_3$$

wherein $n$ is an integer from between 0 and 4, inclusive. Diurethane of this general formula may be prepared by reacting the respective acid chlorides with ethyl carbamate, i. e. oxalyl chloride, malonyl chloride, succinyl chloride, glutaryl chloride and adipyl chloride. These compounds may also be prepared by reacting their respective amides with ethyl chlorocarbonate, i. e. oxamide, malonamide, succinamide, glutaramide, and adipamide. In order that those skilled in the art may more fully understand the inventive concept herein presented the following examples are given by way of illustration only unless otherwise noted in the appended claims.

*Example 2*

All parts are by weight. To 73 parts of adipic acid was added 77 parts of phosphoric oxychloride. After heating for 1½ hours in a water bath at 92° C., the mixture was allowed to stand over night. To this mixture was added 89 parts of ethyl carbamate and the mixture was heated at temperatures of from 60° to 70° C. A vigorous reaction took place and the mass solidified. After cooling, the crystals were washed with water and recrystallized from alcohol. The purified diurethane was then washed with dilute sodium bicarbonate solution, water and alcohol.

*Example 3*

All parts are parts by weight. To 89 parts of ethyl carbamate suspended in 200 parts of benzene were added 25 parts of oxalyl chloride. After standing at room temperature for 2 hours, the mixture was refluxed 3 hours, cooled and filtered. The residue was washed with dilute sodium bicarbonate solution, water and air dried.

A diurethane prepared as set forth above was then mixed with the aniline formaldehyde resin and the mixture cured at elevated temperatures and atmospheric pressure. I have found that from about 0.5 part to about 5 parts of the diurethane may be mixed with 10 parts of the aniline formaldehyde resin and made to cure at temperatures from about 125° C. to about 200° C. in a period of from about ½ hour to about 2 hours. More specifically I have found that from about 1 part to about 4 parts of a diurethane prepared as above set forth mixed with 10 parts of aniline formaldehyde resin will cure at temperatures between about 150° and about 175° C. in a period of from about ½ hour to about 1½ hours. An aniline formaldehyde resin which has not been reacted with the particular diurethanes herein disclosed was still soft and thermoplastic after being heated at 150° C. for a period of hours.

|  | I | II | III | IV | V | VI |
|---|---|---|---|---|---|---|
| Oxalyldiurethane (parts) | 1 | 2 |  |  |  |  |
| Adipyldiurethane (parts) |  |  | 2 | 4 | 2 |  |
| Aniline formaldehyde resin (parts) | 10 | 10 | 10 | 10 | 10 | 10 |
| Cure T. (° C.) | 150 | 150 | 150 | 150 | 175 | 150 |
| Cure time (hrs.) | [1] | 0.5 | 0.5 | 1 | 1.5 | 1.5 |

[1] After a period of two hours, control resin was still soft and fluid.

The cross-linked aniline formaldehyde resin produced by the method herein disclosed finds particular use in the preparation of potting compounds for electrical use. They also find employment in the manufacture of plastic laminates and molded plastics having special electrical properties.

I claim:

1. The process of preparing resinous composition which comprises reacting aniline formaldehyde resin with a cross-linking compound represented by the general formula

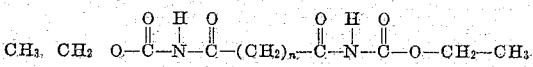

wherein $n$ is an integer between 0 and 4, inclusive.

2. The process of preparing resinous compositions which comprises reacting aniline formaldehyde resin with a cross-linking compound selected from the group consisting of adipyldiurethane and oxalyldiurethane.

3. The process of preparing resinous compositions which comprises reacting aniline formaldehyde resin with adipyldiurethane.

4. The process of preparing resinous compositions which comprises reacting aniline formaldehyde resins with oxalyldiurethane.

5. A resinous composition comprising aniline formaldehyde resin cross-linked with a compound represented by the general formula

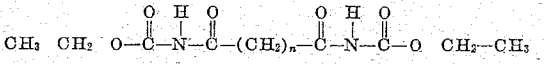

wherein $n$ is an integer of between 0 and 4, inclusive.

6. A resinous composition comprising aniline formaldehyde resin cross-linked with a compound selected from the group consisting of adipyldiurethane and oxalyldiurethane.

7. A resinous composition comprising aniline formaldehyde resin cross-linked with adipyldiurethane.

8. A resinous composition comprising aniline formaldehyde resin cross-linked with oxalyldiurethane.

No references cited.